Patented July 30, 1935

2,009,488

UNITED STATES PATENT OFFICE 2,009,488

WAX EMULSION

Arthur H. French, Decatur, Ill., assignor to A. E. Staley Manufacturing Company, Decatur, Ill., a corporation of Delaware No Drawing. Application July 30, 1932, Serial No. 627,121

2 Claims. (Cl. 134—22)

This invention relates to the production of a wax emulsion and more particularly to a wax emulsion adapted for the sizing of papers including, but not merely including, cellulosic and asbestos paper.

A principal object of the invention is the provision of a wax emulsion size which may be used in the beaters and which may be employed to produce a paper of greater strength and hardness than heretofore generally possible with sizes of the character described.

Wax emulsion sizes emulsified with soap have been produced and used with some degree of satisfaction and this invention has for one of its objects the production of a wax emulsion size which may be employed to produce a finished paper of harder surface and stronger texture than that resulting from the use of earlier known emulsion wax sizes.

Another important object of the invention is the provision of an improved process for producing a size of the character described which may be conveniently and economically practiced. In the production of the emulsion considerable foaming has resulted and this application contemplates the reduction of this foaming to a minimum through the employment of a corn oil soap as an emulsifying agent.

In accordance with the present invention, I first emulsify a corn oil soap with water to form a paste. I next mix into this paste modified starch in the ratio of preferably approximately about 15 parts of modified starch to 10 parts of corn oil soap. Thereafter, and while the mixture of corn oil soap and modified starch is constantly agitated, I incorporate a wax, preferably melted paraffin, although other waxes such as Montan, Japan, caranuba, etc. may be used alone or in substitution for a portion of the paraffin. The wax may be incorporated in the amount of 75 parts to 15 parts of modified starch and 10 parts of soap.

The mixture thus produced may be incorporated in the beaters in which event I prefer to add a small percentage of paper manufacturers' alum to aid in the precipitation as the retention of the size is increased in this way. The mixture thus produced may also be used as a surface sizing and so used as mixed with sufficient water to produce the desired fluidity. The amount of water equal to the weight of the wax component is satisfactory.

The corn oil soap prevents foaming in the compounding of the size and I have discovered that the modified starch eliminates to a large degree the softening effect upon the paper heretofore produced through the use of wax emulsion sizes.

The resulting size paper has a high finished hard surface and the sizing is equally applicable to cellulosic and asbestos paper stocks. In connection with asbestos paper, the resulting size renders the paper highly water resistant.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. A process of making a size for paper and the like, including the steps of making a paste of corn oil soap and water, making a mixture of this paste with starch and compounding this mixture with wax and diluting the compounded preparation with water to give the desired fluidity for sizing purposes to the preparation.

2. A process of making a size for paper and the like, which comprises the steps of making a paste of corn oil soap and water by emulsifying the soap in the water, mixing this paste with starch in the proportion of fifteen parts of starch to ten parts of corn oil soap, and incorporating melted wax with the mixture in the ratio of 75 parts of wax to 15 parts of starch.

ARTHUR H. FRENCH.